US006503470B1

(12) United States Patent
Nolan et al.

(10) Patent No.: US 6,503,470 B1
(45) Date of Patent: Jan. 7, 2003

(54) USE OF SULFIDE-CONTAINING LIQUORS FOR REMOVING MERCURY FROM FLUE GASES

(75) Inventors: Paul S. Nolan, North Canton, OH (US); William Downs, Alliance, OH (US); Ralph T. Bailey, Uniontown, OH (US); Stanley J. Vecci, Alliance, OH (US)

(73) Assignees: The Babcock & Wilcox Company, New Orleans, LA (US); McDermott Technology, Inc., New Orleans, LA (US)

( * ) Notice: Subject to any disclaimer, the term of this patent is extended or adjusted under 35 U.S.C. 154(b) by 0 days.

(21) Appl. No.: 09/464,806

(22) Filed: Dec. 17, 1999

Related U.S. Application Data

(63) Continuation-in-part of application No. 09/282,817, filed on Mar. 31, 1999, now Pat. No. 6,284,199.

(51) Int. Cl.[7] .............................................. B01D 53/64
(52) U.S. Cl. ...................................................... 423/210
(58) Field of Search ........................................ 423/210

(56) References Cited

U.S. PATENT DOCUMENTS

| | | | |
|---|---|---|---|
| 3,855,387 A | 12/1974 | Brockmiller et al. ........ | 423/210 |
| 3,892,837 A | 7/1975 | Uchiyama et al. .......... | 423/242 |
| 3,981,972 A | 9/1976 | Hishinuma et al. ......... | 423/244 |
| 4,094,879 A | 6/1978 | Bates et al. ................. | 260/299 |
| 4,098,697 A | 7/1978 | DeAngelis et al. .......... | 210/202 |
| 4,190,709 A | 2/1980 | Hodgkin ...................... | 521/39 |
| 4,230,183 A | 10/1980 | Kalfoglou ................... | 166/274 |
| 4,273,747 A | 6/1981 | Rasmussen ................. | 423/210 |
| 4,283,303 A | 8/1981 | Ellis ........................... | 252/188 |
| 4,285,819 A | 8/1981 | Yen et al. .................... | 210/679 |
| 4,377,484 A | 3/1983 | Nasrallah .................... | 210/698 |
| 4,578,195 A | 3/1986 | Moore et al. ................ | 210/679 |
| 4,857,183 A | 8/1989 | Bommer ..................... | 210/127 |
| 4,889,698 A | 12/1989 | Moller et al. ............... | 423/210 |
| 4,889,701 A | 12/1989 | Jones et al. ................. | 423/220 |
| 4,975,264 A | 12/1990 | Franken ...................... | 423/522 |
| 5,139,982 A | 8/1992 | Ayala et al. ................. | 502/182 |
| 5,168,065 A | 12/1992 | Jankura et al. .............. | 436/55 |
| 5,238,665 A | 8/1993 | Lerner ........................ | 423/240 |
| 5,246,471 A | 9/1993 | Bhat et al. ................... | 55/223 |
| 5,308,509 A | 5/1994 | Bhat et al. .................. | 210/770 |
| 5,354,363 A | 10/1994 | Brown, Jr. et al. ........... | 95/134 |
| 5,405,593 A | 4/1995 | Knudson ................. | 423/244.03 |
| 5,419,834 A * | 5/1995 | Straten .................... | 210/198.1 |
| 5,459,040 A | 10/1995 | Hammock et al. ........... | 435/7.1 |
| 5,500,196 A | 3/1996 | Rogers et al. ............ | 423/242.1 |
| 5,520,897 A | 5/1996 | Rogers et al. ............ | 423/242.1 |
| 5,564,105 A | 10/1996 | Alvino et al. ................ | 588/20 |
| 5,599,508 A * | 2/1997 | Martinelli et al. .......... | 422/169 |
| 5,622,996 A | 4/1997 | Fish ............................ | 521/33 |
| 5,672,323 A | 9/1997 | Bhat et al. .................. | 422/172 |
| 5,795,548 A | 8/1998 | Madden et al. ............. | 422/171 |
| 5,827,352 A | 10/1998 | Altman et al. ................ | 95/58 |
| 5,834,525 A | 11/1998 | Fish ............................ | 521/33 |
| 6,214,304 B1 * | 4/2001 | Rosenthal et al. .......... | 423/210 |

FOREIGN PATENT DOCUMENTS

| | | | | |
|---|---|---|---|---|
| EP | 0709 128 A3 | 5/1996 | | |
| JP | 57-7232 A | * | 1/1982 | ................. 423/210 |
| JP | 62-186925 A | * | 8/1987 | ................. 423/210 |

OTHER PUBLICATIONS

B. L. Jackson and M. S. Devito, *Major Findings and Results from Comprehensive Assessment of Emissions from Two Coal–Fired Power Plants*, U. S. Dept. of Energy, PETC, Tenth Annual Coal Preparation, Utilization and Environmental Contractor's Conference, Proceedings, vol. 1, Jul. 18–21, 1994, pp. 275–285.

*Steam/its generation and use*, 40th Edition, The Babcock & Wilcox Company ©1992, pp. 35–2 through 35–13.

J. Peterson et al., "Mercury Removal by Wet Limestone FGD Systems: EPRI HSTC Test Results," 94–RP114B.01, presented at the 87th Annual Meeting & Exhibition of Air & Waste Management Association, Cincinnati, Ohio, Jun. 19–24, 1994, pp. 1–16.

R. Chang, et al., "Pilot Scale Evaluation of Activated Carbon for the Removal of Mercury at Coal–Fired Utility Power Plants," presented at the 2nd International Hazard Pollution Management, Washington, DC, Jul. 13–15, 1993, pp. 1–17.

B. K. Gullett, et al., "Bench–Scale Sorption and Desorption of Mercury with Activated Carbon," presented at International Conference MWC, Williamsburg, VA, Mar. 30–Apr. 2, 1993, 8 pages.

A. Licata et al., "An Economic Alternative to Controlling Acid Gases, Mercury and Dioxin from MWCs," 94–MP17.06, presented at the 87th Annual Meeting & Exhibition for Air & Waste Management Association, Cincinnati, Ohio, Jun. 19–24, 1994, pp. 1–21.

R. Chang et al., "Sorbent Injection for Flue Gas Mercury Control," 94–WA68A.01, presented at the Air & Waste Management Association Conference, Cincinnati, Ohio, Jun. 1994, 13 pages.

C. Jones, "Consensus on air toxics eludes industry to date," *Power*, Oct. 1994, pp. 51–52, 55–56, 58–59.

J. R. Morency, "Control of Mercury in Fossil Fuel–Fired Power Generation," presented at DOE Contractors Meeting, Pittsburgh, PA, Jul. 21, 1994, pp. 1–7.

(List continued on next page.)

*Primary Examiner*—Stanley S. Silverman
*Assistant Examiner*—Timothy Vanoy
(74) *Attorney, Agent, or Firm*—Robert C. Baraona; Eric Marich

(57) ABSTRACT

A method and apparatus for reducing and removing mercury in industrial gases, such as a flue gas, produced by the combustion of fossil fuels, such as coal, adds sulfide ions to the flue gas as it passes through a scrubber. Ideally, the source of these sulfide ions may include at least one of: sulfidic waste water, kraft caustic liquor, kraft carbonate liquor, potassium sulfide, sodium sulfide, and thioacetamide. The sulfide ion source is introduced into the scrubbing liquor as an aqueous sulfide species. The scrubber may be either a wet or dry scrubber for flue gas desulfurization systems.

10 Claims, 4 Drawing Sheets

OTHER PUBLICATIONS

*Steam/its generation and use*, 40th Edition, The Babcock & Wilcox Company, ©1992, pp.:cover, ii, 35–1 thru 35–16.

K. E. Redinger et al., "Mercury Emissions Control in RGD Systems," presented at the EPRI/DOE/EPA Combined Utility Air Pollutant Control Symposium, Washington, DC, Aug. 25–29, 1997, 17 pages.

M. J. Holmes, et al., "Advanced Emissions Control Development Program," presented at the Advanced Coal–Based Power and Environmental Systems '98 Conference, Morgantown, West VA, Jul. 21–23, 1998, 16 pages.

G. A. Farthing et al., "B&W's Advanced Emissions Control Development Program," presented at the 20th International Technical Conference on Coal Utilization & Fuel Systems, Clearwater, Florida, Mar. 20–23, 1995, 12 pages.

R.D. Vidic and J. B. McLaughlin, "Uptake of Elemental Mercury Vapors by Activated Carbons," *Journal of the Air and Waste Management Association*, vol. 46, Mar. 1996, pp. 241–250.

J. G. Noblett, Jr. et al, "Control of Air Toxics from Coal–Fired Power Plants Using FPG Technology," presented at the RPRI Second International Conference on Managing Hazardous Air Pollutants, Washington, DC, Jul. 1993, 15 pages.

R. Chang and D. Owens, "Developing Mercury Removal Methods for Power Plants," *EPRI Journal*, Jul./Aug. 1994, pp. 46–49.

K. Felsvang et al., "Air Toxics Control by Spray Dryer Absorption Systems," presented at Power–Gen '92, Orlando, FL, Nov. 1992, pp. VI–1 thru VI–17.

R. Change and G. R. Offen, Mercury emission control technologies: An EPRI synopsis, *Power Engineering*, Nov. 1995, pp. 51–57.

"Emission Factors Handbook: Guidelines for Estimating Trace Substance Emission from Fossil Fuel Steam Electric Plants," *EPRI*, TR–105611s, Nov. 1995, pp: Cover, Report Summary, 2,2–11, 2–12, and 2–13.

Advertisement by The Dow Chemical Company, Properties of EDTA, DTPA, HEDTA, and NTA, 1974, 2 pages.

E. H. Hall, Status Report from Battelle Memorial Institute, Columbus, Ohio, "Mercury Emissions and Controls," May 1, 1994, 94TEC–1, 49 pages.

R. Meu, "The Fate of Mercury in Coal–Fired Power Plants and the Influence of Wet Flue–Gas Desulphurization," *Water, Air and Soil Pollution*, 56:21–33, 1991, pp. 21–29.

R. Gleiser et al., "Mercury Emission Reduction Using Activated Carbon with Spray Dryer Flue Gas Desulfurization," presented at 36th Annual Meeting American Power Conference, Chicago, Apr. 25–27, 1994, pp. 452–457.

R. Gleiser et al, "Control of Mercury from MSW Combustors by Spray Dryer Absorption Systems and Activated Carbon Injection," MSW Conference Proceedings, Williamsburg, VA, 1993, pp. 106–122.

K. E. Redinger and A. P. Evans, "Mercury Speciation and Emissions Control in FGD Systems," presented at the 22nd International Technical Conference on Coal Utilization & Fuel Systems, Mar. 17–20, 1997.

M. J. Holmes et al., "Control of Mercury in Conventional Flue Gas Emissions Control Systems," presented at the Managing Hazardous Air Pollutants Conference, Washington, DC, Nov. 12–14, 1997, 17 pages.

C. D. Livengood et al., "Improved Mercury Control in Wet Scrubbing Through Modified Speciation," presented at the EPRI/DOE/EPA Combined Utility Air Pollutant Control Symposium, Washington, DC, Aug. 25–29, 1997, 16 pp.

* cited by examiner

USE OF SULFIDE-CONTAINING LIQUORS FOR REMOVING MERCURY FROM FLUE GASES

CROSS REFERENCE TO RELATED APPLICATION

The present application is a continuation-in-part of U.S. patent application Ser. No. 09/282,817, filed on Mar. 31, 1999, now U.S. Pat. No. 6,284,199, titled "Mercury Control in a Wet Scrubber Using Hydrogen Sulfide," which is herein incorporated by reference in its entirety.

The subject matter of the present invention was developed under a research contract with the U.S. Department of Energy (DOE), Contract No. DE-FC22-94PC94251, and under a grant agreement with the Ohio Coal Development Office (OCDO), Grant Agreement No. CDO/D-922-13. The governments of the United States and Ohio have certain rights in the invention.

FIELD AND BACKGROUND OF THE INVENTION

The present invention relates generally to the field of combustion and flue gas cleanup methods and apparatus and, in particular, to a new and useful method and apparatus for removing mercury from the flue gases generated during the combustion of fossil fuels such as coal, or solid wastes, through the use of hydrogen sulfide.

In recent years, the U.S. Department of Energy (DOE) and the U.S. Environmental Protection Agency (EPA) have supported research to measure and control the emissions of Hazardous Air Pollutants (HAPs) from coal-fired utility boilers and waste to energy plants. The initial results of several research projects showed that the emissions of heavy metals and volatile organic carbons (VOCs) are very low, except for mercury (Hg). Unlike most of the other metals, most of the mercury remains in the vapor phase and does not condense onto fly ash particles at temperatures typically used in electrostatic precipitators and fabric filters. Therefore, it cannot be collected and disposed of along with fly ash like the other metals. To complicate matters, mercury can exist in its oxidized ($Hg^{+2}$) form, principally as mercuric chloride, ($HgCl_2$), or in its elemental ($Hg^0$) form as vaporous metallic mercury. The relative amount of each species appears to depend on several factors such as fuel type, boiler combustion efficiency, the type of particulate collector installed, and various other factors.

The search for industrially acceptable methods for the capture of mercury from industrial flue gases has included a significant effort to determine how much mercury can be removed by existing, conventional air pollution control equipment, such as wet or dry scrubbers.

Accordingly, tests have been performed on several commercial scale and pilot scale wet scrubbers. In addition to being applicable to dry scrubber situations, these tests have produced some expected and some surprising results. It was generally expected that the oxidized mercury would be easily captured and the elemental mercury would be difficult to capture. These expectations were based on the high solubility of mercuric chloride in water and the very low solubility of elemental mercury in water. This expectation was generally fulfilled.

The surprising result concerned elemental mercury. Repeated tests during which the concentration of elemental mercury in the flue gas was measured revealed that more elemental mercury was leaving the wet scrubber than was entering.

One postulate proposed to explain the cause of the elemental mercury generation in the wet scrubber is described for example, by the following general reactions:

$$M_e^x + Hg^{+2} \rightarrow M_e^{x+2} + Hg^0$$

$$2M_e^x + Hg^{+2} \rightarrow 2M_e^{x+1} + Hg^0$$

$M_e$ is any number of transition metals such as Fe, Mn, Co, etc., that may be present in one of several possible oxidation states, x.

Transition metal ions are generally present in wet scrubber slurries as impurities in the industrial applications of concern. Thus, as the mercuric chloride is absorbed, a portion reacts with and becomes reduced by trace levels of transition metals and metal ions and because of its low solubility the elemental mercury is stripped from the liquid and returned to the flue gas.

Most of the recent efforts to capture and remove mercury from the flue gas produced by coal-fired units have concentrated on gas-phase reactions with introduced reagents such as activated carbon.

The subject of mercury emissions by the utility and waste to energy industries is a new area being investigated by both the DOE and EPA.

SUMMARY OF THE INVENTION

The present invention provides a means in a wet or dry scrubber to rapidly precipitate the oxidized mercury at the gas/liquid interface in the scrubber before it can be reduced by the transition metals. One of the most insoluble forms of mercury is mercuric sulfide, which in mineral form is cinnabar. One means for supplying a source of sulfide to react with the oxidized mercury is aqueous sulfide ions. Thus, at the gas/liquid interface in the scrubber, the following reaction is proposed for the absorption and precipitation of ionized (oxidized) mercury:

$$S^{-2}(aq) + HgCl_2(g) \rightarrow HgS(s) + 2\ Cl^-(aq)$$

HgS has a solubility product of $3 \times 10^{-52}$ and therefore precipitates essentially completely. The aqueous sulfide species is added to the scrubbing liquor of the scrubber and comes into contact with the mercury in the flue gas, such that HgS is formed when the mercury is absorbed into the liquor. Therefore, the oxidized mercury will rapidly precipitate as cinnabar in the scrubber and thereby prevent the reduction of that mercury back to vaporous elemental mercury. The precipitation of mercury as cinnabar has a distinct advantage over other mercury sequestering methods in that it converts mercury to a very insoluble form. In this way, the mercury should be inert and effectively removed from the food chain.

Accordingly, one aspect of the present invention is drawn to an improvement in a method using a scrubber for receiving and scrubbing an industrial gas containing mercury, the improvement comprising: adding an aqueous sulfide salt to the industrial gas and scrubbing the industrial gas in the scrubber. The method according to the present invention is particularly suited to the task of reducing mercury emissions in an industrial process which burns coal in a furnace to produce an exhaust flue gas, including conveying the exhaust flue gas through a dust collector, such as a fabric filter or electrostatic precipitator.

Another aspect of the present invention is drawn to an apparatus using a scrubber for receiving and scrubbing an industrial gas containing mercury with an aqueous alkali reagent, and particularly the improvement comprising: means for providing sulfide ions and means for controlling the sulfide ions provided to the industrial gas in the scrubber. The present invention is again particularly suited to utility installations which burn fossil fuels such as coal, or solid wastes, and which use a dust collector (such as an electrostatic precipitator or a fabric filter), in addition to the scrubber, and/or other conventional components for reducing emissions to the atmosphere.

Another aspect of the present invention is drawn to an apparatus for receiving and scrubbing an industrial gas containing mercury with an aqueous alkali reagent, comprising a scrubber, having a scrubber liquor, for scrubbing the industrial gas with the aqueous alkali reagent; flue means for conveying the industrial gas to the scrubber; means for providing sulfide ions; and means for controlling the sulfide ions provided to the industrial gas. The present invention is again particularly suited to utility installations which burn fossil fuels, such as coal, and may be incorporated into a wet or dry scrubber.

All aspects of the present invention contemplate means for providing sulfide ions, including but not limited to hydrosulfide ($HS^-$) ions. Notably, such hydrosulfide ions ($HS^-$) provide sulfide ions ($S^{-2}$) by virtue of the equilibrium in aqueous solution:

This means can be accomplished through the addition of an aqueous sulfide species, such as sulfidic waste water, kraft caustic liquor, kraft carbonate liquor, potassium sulfide, sodium sulfide, and/or thioacetamide, to the scrubbing liquor in the scrubber. Further, control means, such as a separate storage tank and metering pump, may be employed to selectively control the provision of sulfide to meet specific operational requirements.

This system has an inherent safety advantage in that no $H_2S$, which is odorous and toxic, is accumulated or stored. Further, the system is versatile in that it is equally applicable to wet or dry scrubbers and may be incorporated into current emissions control systems with minimal modifications or additions.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

DESCRIPTION OF THE PREFERRED EMBODIMENTS

Figure 1:
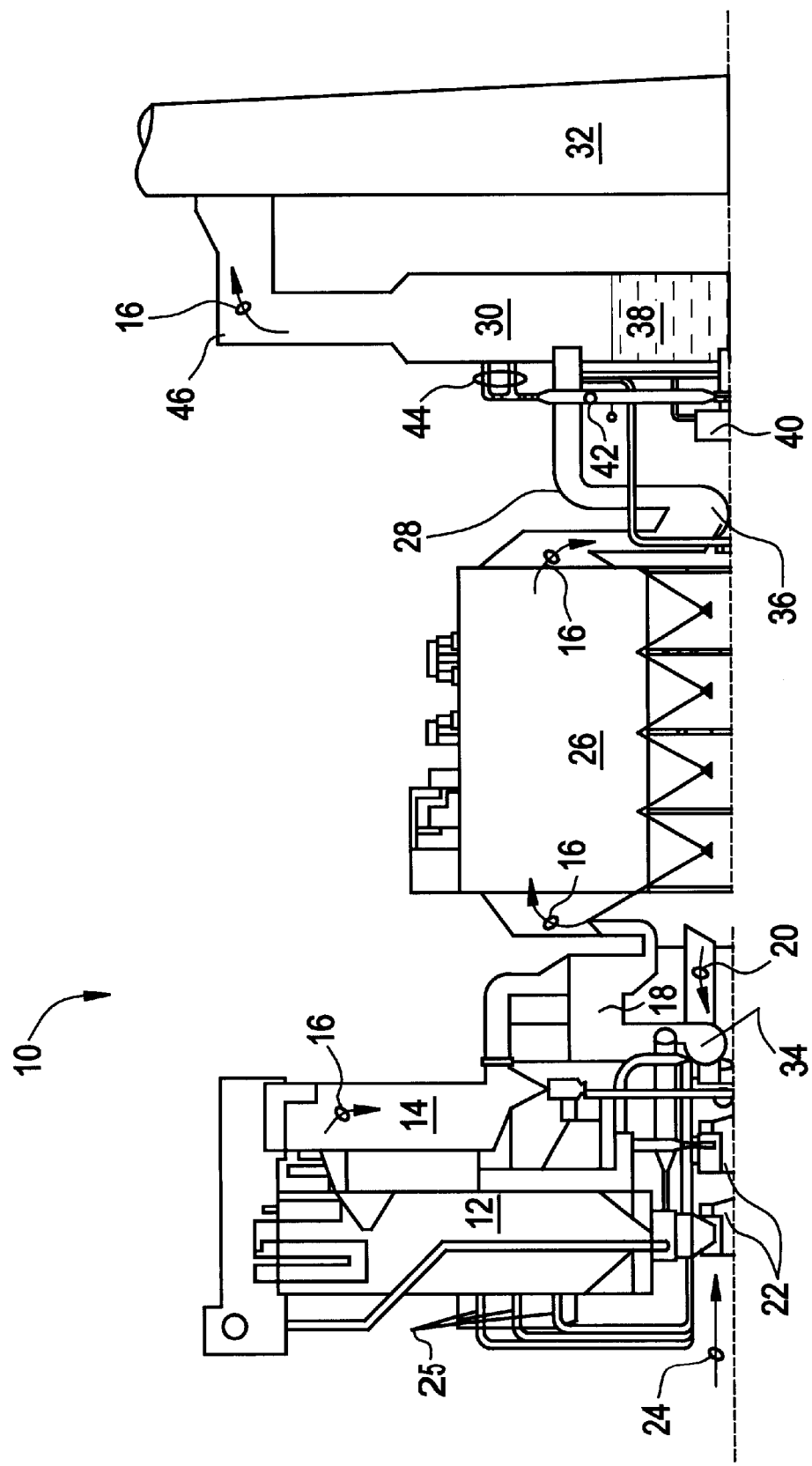
FIG. 1 is an illustration of a prior art a coal-fired utility boiler installation of the type used by utilities in the generation of electric power and into which the present invention may be installed.

Referring to the drawings generally, wherein like reference numerals designate the same or functionally similar elements throughout the several drawings, and to FIG. 1 in particular, FIG. 1 illustrates a coal-fired utility boiler installation of the type used by utilities in the generation of electric power, generally designated 10, and which represents one type of industrial process to which the present invention is applicable. In its broadest form, the present invention comprises a method for removing mercury from the flue gas generated during the combustion of fossil fuels or solid wastes through the use of aqueous sulfide ions. Of course, while the aforementioned coal-fired utility boiler installations are but one example, and the method of the present invention will likely first find commercial application to the removal of mercury from the flue gases produced by such utility boiler installations which combust such fossil fuels, any industrial process using a wet scrubber type of absorber module to purify such flue gases may benefit. Such processes could include incineration plants, waste to energy plants, or other industrial processes which generate gaseous products containing mercury. Thus for the sake of convenience, the terms industrial gas, flue gas, or simply gas will be used in the following discussion to refer to any gas from an industrial process and from which an objectionable component, such as mercury, is to be removed.

As will be described infra, an alternate embodiment of the present invention involves methods and apparatus for the addition of aqueous sulfide ions to industrial gases which are treated by dry scrubber flue gas desulfurization systems. Thus, while the majority of the following description is presented in the context of the present invention as being applied to wet scrubber systems, it will be appreciated that the present invention is not limited thereto. Further, since both wet and dry scrubbers remove sulfur species from the flue gas by introduction of an alkali sorbent, some common terminology may be used as appropriate for the sake of convenience. In the case of wet scrubbers, the alkali sorbent can be provided as an aqueous alkali solution or slurry; in dry scrubbers, the alkali sorbent is usually provided as an aqueous alkali slurry. Thus, for the sake of convenience in the following description, the term aqueous alkali reagent will be used to encompass both aqueous alkali solutions and/or aqueous alkali slurries as appropriate to the type of scrubber means being used.

As illustrated in FIG. 1, and proceeding in the direction of flue gas flow generated during the combustion process, the boiler installation 10 includes a furnace 12 having a gas outlet 14 which conveys flue gases, generally designated 16, to an air heater 18 used to preheat incoming air 20 for combustion. Pulverizers 22 grind a fossil fuel 24 (e.g., coal) to a desired fineness and the pulverized coal 24 is conveyed via burners 25 into the furnace 12 where it is burned to release heat used to generate steam for use by a steam turbine-electric generator (not shown). Flue gas 16 produced by the combustion process are conveyed through the gas outlet 14 to the air heater 18 and thence to various types of downstream flue gas cleanup equipment. The flue gas cleanup equipment may comprise a fabric filter or, as shown, an electrostatic precipitator (ESP) 26 which removes particulates from the flue gas 16. A flue 28 downstream of the ESP 26 conveys the flue gas 16 to a wet scrubber absorber module 30 which is used to remove sulfur dioxide and other contaminants from the flue gas 16. Flue gas 16 exiting from the wet scrubber absorber module or, simply, the wet scrubber 30, is conveyed to a stack 32 and exhausted to atmosphere. Forced draft fans 34 and induced draft fans 36 are used to propel the air 20, fuel 24, and flue gases 16 through the installation 10. For further details of various aspects of such installations 10, the reader is referred to STEAM its

*generation and use*, 40th Ed., Stultz and Kitto, Eds., Copyright © 1992 The Is Babcock & Wilcox Company, particularly to Chapter 35—Sulfur Dioxide Control, the text of which is hereby incorporated by reference as though fully set forth herein. While the aforementioned *STEAM* reference contains a description of one form of wet scrubber 30 produced by The Babcock & Wilcox Company (B&W) and to which the present invention is applicable, the present invention is not limited to such B&W wet scrubber designs. Persons skilled in the art will appreciate that the principles of the present invention apply equally well to other types of wet scrubber designs, available from other manufacturers.

The wet scrubber 30 contains, in a lower portion thereof, an inventory of scrubber liquor 38. During operation of the wet scrubber 30, recirculation pumps 40 pump and recirculate the scrubber liquor 38 up through pipes 42 and into absorber spray headers 44 located in an upper portion of the wet scrubber 30. The scrubber liquor 38 is sprayed into the flue gas 16 where it absorbs $SO_2$. The scrubber liquor 38 falls down through various devices and drains back into the lower portion of the wet scrubber 30. The scrubbed flue gas 16 then exits from a wet scrubber outlet 46 and is eventually conveyed to the stack 32.

Figure 2:
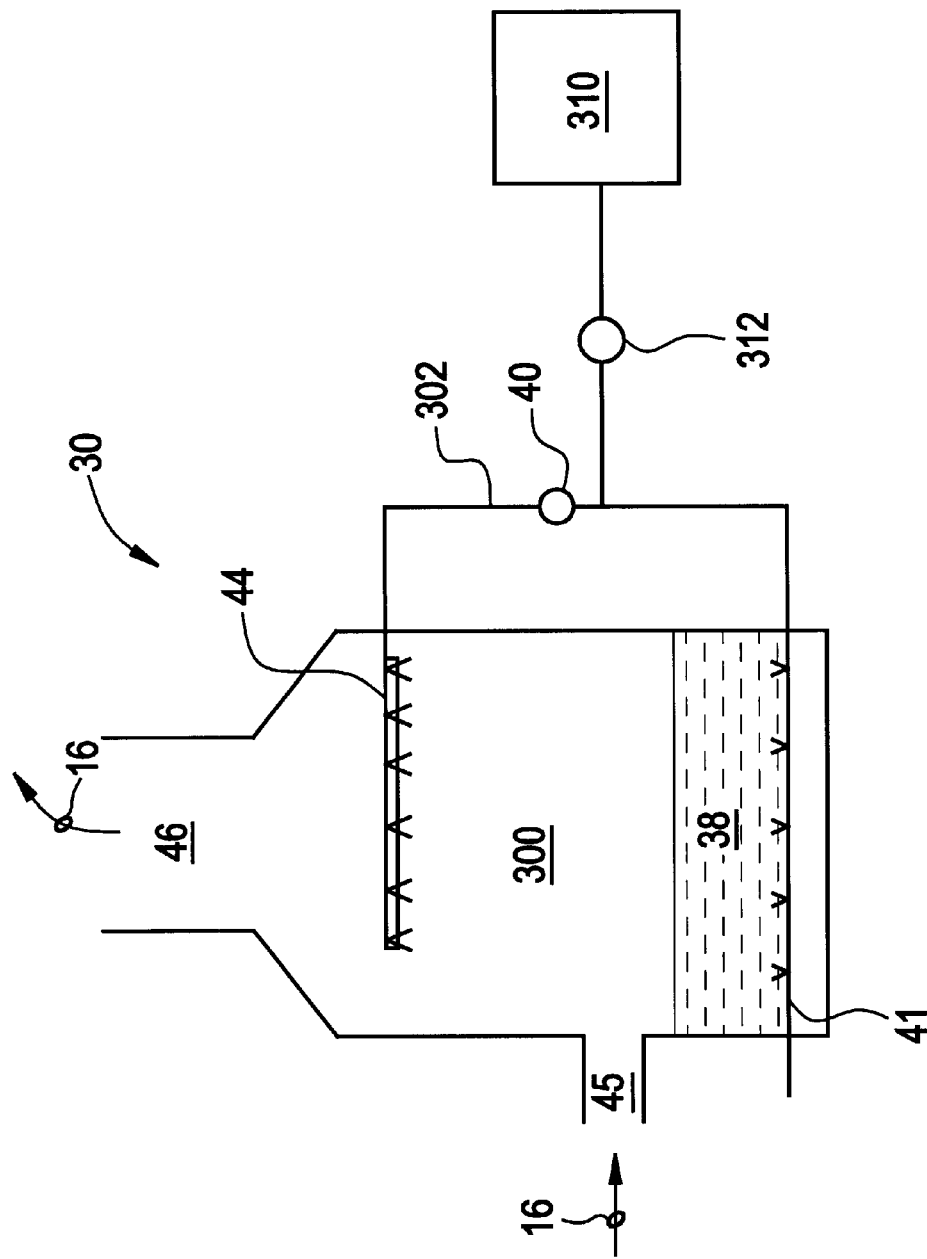
FIG. 2 is a schematic illustration of a preferred embodiment of the wet scrubber for the present invention.

FIG. 2 depicts a detailed schematic of a preferred embodiment of the wet scrubber 30. Wet scrubber 30 comprises a main chamber 300 with scrubber inlet 45 and scrubber outlet 46. As above, main chamber 300 has a lower portion containing an inventory of scrubber liquor 38 which recirculates from the main chamber 300 into absorber spray headers 44 by means of general recirculation line 302. General recirculation line 302 may comprise pipes 42 and recirculation pumps 40. Frequently, the lower portion of main chamber 300 containing scrubber liquor 38 will include means for injecting air, such as air sparger 41, into the scrubber liquor 38. The use of air sparger 41 oxidizes the products of $SO_2$ absorption in scrubbing liquor 38. Finally, scrubber liquor 38 may be contained in a bulk storage vessel which forms the lower portion of main chamber 300 (as pictured), or it may comprise a separate holding tank connected to a drain in the main chamber 300 and recirculation line 302.

A sulfide containing salt may be added directly to scrubber liquor 38 and mixed with the flue gas 16 via spray headers 44, thereby creating an aqueous sulfide ion solution (hereafter referred to as an aqueous sulfide species). In turn, by injecting this aqueous sulfide species directly into recirculation pump 40 and/or general recirculation line 302, the added sulfide solution will not be prematurely oxidized before contacting and scrubbing flue gas 16 in the main chamber 300. Most preferably, the source of the sulfide ions can be provided by means of sulfidic waste water, kraft caustic liquor, kraft carbonate liquor, or an aqueous solution containing potassium sulfide, sodium sulfide, and/or thioacetamide.

Alternatively, sulfide ion solution may be added to an isolated sulfide storage tank 310 which is connected to recirculation line 302 upstream of recirculation pump 40. Further, a metering pump 312 may be employed to control the flow of sulfide ions into the wet scrubber 30 and, more particularly, into and/or through recirculation line 302 (a system employing metering pump 312 for control of sulfide into recirculation line 302 only is shown). The concentration of sulfide ion and/or rate of flow into and/or through the recirculation line 302 permits the selective control of the scrubber's overall mercury removing ability. Thus, a coordinated control system, such as using storage tank 310 and/or metering pump 312, is a preferred embodiment of the present invention. The rate of sulfide addition must be proportional to the flue gas flow rate through the scrubber. Most of the sulfide added to the scrubber will be immediately stripped from solution as $H_2S$ in the gas-liquid contact zone. If too much sulfide is added at any one instant, an objectionable odor will emanate from the flue gas at the exit of the stack. It is therefore desirable to limit $H_2S$ concentrations leaving the stack to less than about 2 parts per million (ppm).

To limit the $H_2S$ concentration in flue gas 16 exiting the scrubber to no more than about 2 ppm, the maximum rate of sulfide addition must be less than about $8 \times 10^{-5}$ gm moles per $M^3$ of treated flue gas. A typical 100 megawatt scrubber module treats about $8 \times 10^3$ $M^3$ per minute of flue gas. For such a module, the maximum sulfide addition rate would be $(8 \times 10^{-5}) \times (8 \times 10^3)$, or 0.64 gm moles/min. If a 2 molar solution of sodium sulfide were used, the feed rate would be 0.32 liters per minute. It is understood that these figures are merely illustrative, and do not represent any sort of limitation of the principles disclosed in this application.

In operation, flue gas 16 flows from inlet 45 into main chamber 300. Sulfide ions added to recirculation line 302 allow spray header 44 to mix the sulfide ions and scrubber liquor 38 with the flue gas 16. This contact initiates the chemical reaction, supra, which removes mercury. The flue gas then flows through outlet 46 and into the stack 32. The precipitated mercury remains in scrubber liquor 38 and can be subsequently removed and disposed of by various methods known to those skilled in the art.

Figure 3:
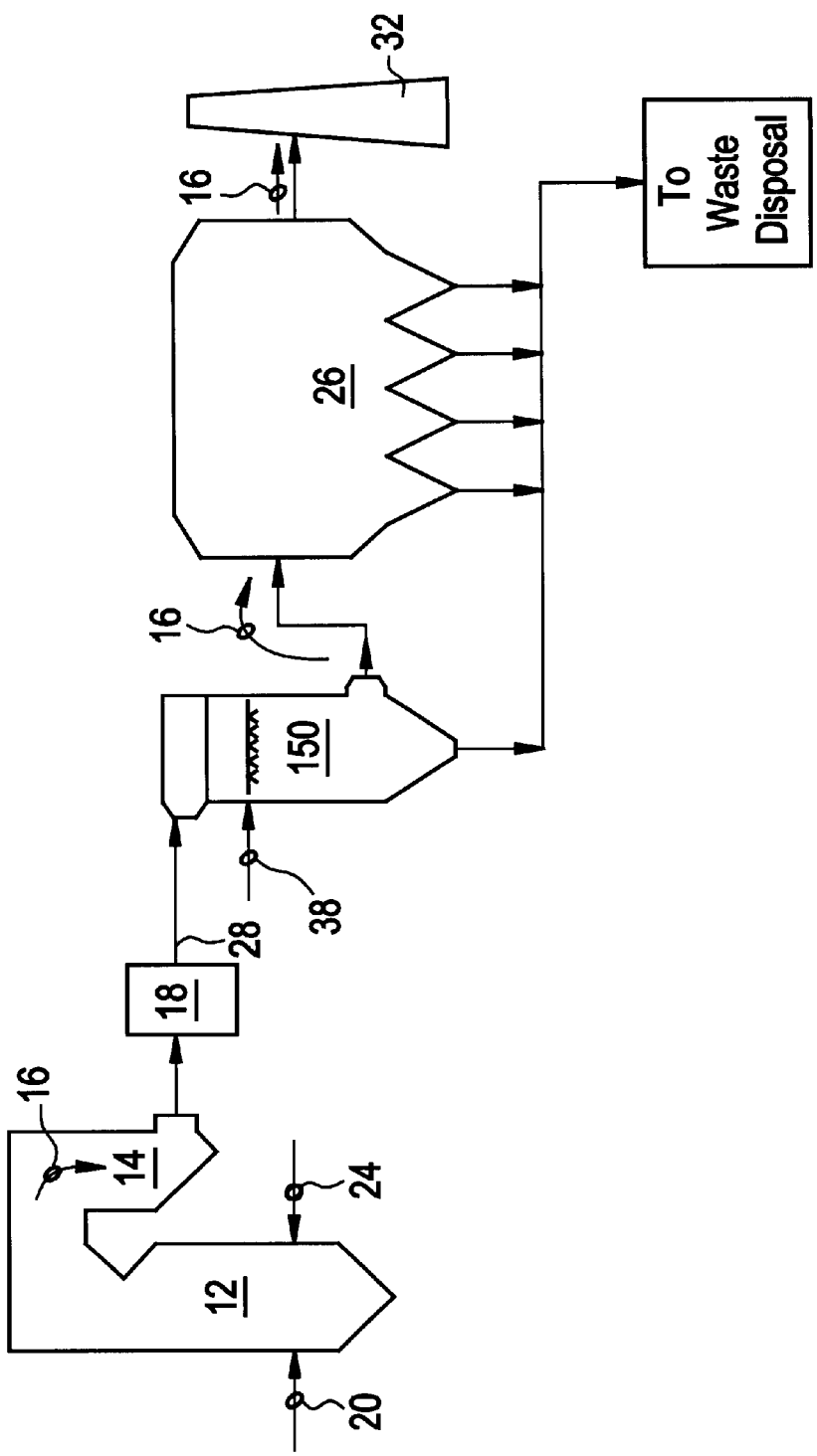
FIG. 3 is an illustration of the present invention as applied to a coal-fired utility boiler installation of the type used by utilities in the generation of electric power which employs a dry scrubber flue gas desulfurization system.

As described earlier and as illustrated in FIG. 3, the present invention is also applicable to combustion systems employing dry scrubbers for flue gas desulfurization. Again, like reference numerals designate the same or functionally similar parts. Flue gas 16 produced by the combustion process are conveyed through the gas outlet 14 to the air heater 18 and thence to various types of downstream flue gas cleanup equipment. A flue 28 conveys the flue gas 16 to a dry scrubber absorber module 150 which is used to remove sulfur dioxide and other contaminants from the flue gas 16. Flue gas 16 exiting from the dry scrubber 150 is conveyed to a fabric filter or, as shown, an electrostatic precipitator (ESP) 26 which removes particulates from the flue gas 16 and then the flue gas 16 is conveyed to a stack 32 and exhausted to atmosphere. As in FIG. 1, forced draft fans 34 and induced draft fans 36 (not shown in FIG. 3) are used to propel the air 20, fuel 24, and flue gases 16 through the installation 10 as before.

Figure 4:
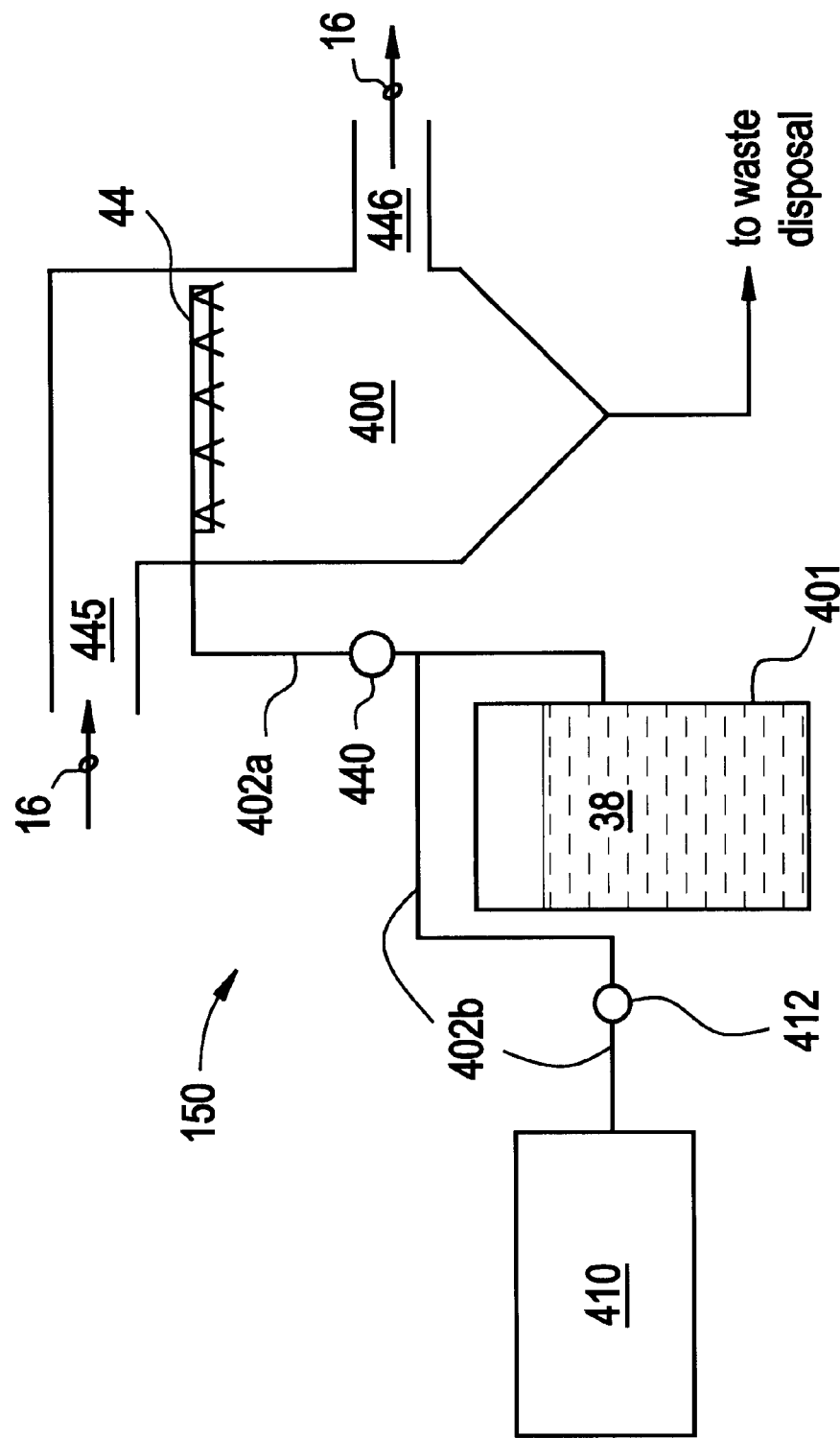
FIG. 4 is a schematic illustration of a preferred embodiment of the dry scrubber for the present invention.

FIG. 4 depicts a detailed schematic of a preferred embodiment of the dry scrubber 150. Dry scrubber 150 comprises a main chamber 400 with spray header 44, scrubber inlet 445, and scrubber outlet 446. Notably, scrubber liquor 38 may be contained in a bulk storage vessel 401 and provided to main chamber 400 by means of first feed line 402a. Feed line 402a may contain a scrubber liquor feed pump 440.

A sulfide containing salt may be added directly to scrubber liquor 38 in vessel 401, pumped to main chamber 400 via first feed line 402a, and mixed with flue gas 16 via spray headers 44. Most preferably, sulfide ions can be provided by means of sulfidic waste water, kraft caustic liquor, kraft carbonate liquor, or an aqueous solution containing potassium sulfide, sodium sulfide, and/or thioacetamide.

Alternatively, sulfide ion solution may be added to an isolated sulfide storage tank 410 and introduced into the main chamber 400 via spray header 44. Tank 410 is connected to second feed line 402b. Further or in the alternative, a metering pump 412 may be employed to control the flow of sulfide ions into the dry scrubber 150 and, more particularly, into feed line(s) 402a and/or bulk storage vessel 401 (a system employing metering pump 412 for control of feed line 402a only is pictured). The concentration of sulfide ion and/or rate of flow into and/or through the feed line(s) 402a and/or 402b permits the selective control of the scrubber's overall mercury removing ability. Thus, a coordinated control system, such as using storage tank 410 and/or metering pump 412, is a preferred embodiment of the present invention. However, control of sulfide ions provided to the gas may also be achieved by periodic and/or manual addition of the aqueous sulfide ions into the scrubber system by way of a valve, port, or other injection device or by means of a separate system (i.e., chamber, storage means, spray headers, and/or recirculation line).

In operation, flue gas 16 flows from inlet 445 into main chamber 400. Sulfide ions added to feed line 402a and/or bulk storage vessel 401 allow spray header 44 to mix the sulfide ions and scrubber liquor 38 with the flue gas 16. This contact initiates the chemical reaction, supra, which removes mercury. The flue gas then flows through outlet 446 and into the stack 32. The precipitated mercury remains in the dried solid product of scrubber 150 and can be subsequently removed and disposed of by various methods known to those skilled in the art.

Advantages of the present invention include the fact that the cost of control of mercury emissions according to the present invention is relatively low compared to the costs for control of other hazardous air pollutants. Further, the use of aqueous sulfide ions can be incorporated with minimal modifications or additions to current emissions control systems. Most significantly, use of aqueous sulfide ions eliminates the need to produce or have available toxic gases, such as hydrogen sulfide gas, which, when mixed with flue gas containing mercury oxidized by an aqueous alkali reagent may be another method for removing mercury from flue gas. Also, aqueous sulfide ions can be easily metered into the main scrubbing liquor inventory at a specific, desired rate in order to enhance efficiency of the scrubber or to achieve specific results.

According to the present invention, the mercury in the flue gas 16 ends up as mercuric sulfide (also known as cinnabar). This is the chemical form that mercury is most often found in nature and is probably the most desirable chemical form to sequester mercury.

While specific embodiments of the invention have been shown and described in detail to illustrate the application of the principles of the invention, it will be understood that the invention may be embodied otherwise without departing from such principles. By way of example and not limitation, while the principles of the present invention were described as being particularly applicable to fossil-fired boiler installations, it will be appreciated by those skilled in the art that the present invention can be used to remove mercury from industrial gases produced by refuse incinerators, refuse boilers, hazardous waste incinerators, or ore roasters.

We claim:

1. In a method using a scrubber, having a scrubber liquor containing an aqueous alkali reagent, for receiving and scrubbing an industrial gas with the scrubbing liquor, the improvement comprising:
    providing an industrial gas containing oxidized mercury to a scrubber;
    providing an aqueous sulfide species selected from the group consisting of sulfidic waste water, kraft caustic liquor, kraft carbonate liquor, potassium sulfide and sodium sulfide to the scrubber;
    creating a gas-liquid interface within the scrubber and mixing the industrial gas with the aqueous sulfide species in order to rapidly precipitate the oxidized mercury at the gas-liquid interface, thereby producing a mercury-free industrial gas within the scrubber wherein the precipitated mercury remains in the scrubbing liquor; and subsequently removing the mercury-free industrial gas from the scrubber.

2. The method according to claim 1, wherein the scrubber is a wet scrubber and further comprising the step of: conveying the industrial gas through a dust collector to remove particulates from the industrial gas prior to the creating a gas-liquid interface in the wet scrubber.

3. The method according to claim 2, wherein the dust collector is a fabric filter or an electrostatic precipitator.

4. The method according to claim 1, wherein the scrubber is a dry scrubber and further comprising the step of: providing the mercury-free industrial gas to a dust collector in order to remove other non-mercuric particulates from the mercury-free industrial gas.

5. The method according to claim 4, wherein the dust collector is a fabric filter or an electrostatic precipitator.

6. The method according to claim 1, wherein the sulfide species is provided directly to the scrubbing liquor.

7. The method according to claim 6, wherein the scrubber is a wet scrubber and further comprising the steps of: conveying the industrial gas through a dust collector to remove particulates from the industrial gas prior to the creating a gas-liquid interface in the wet scrubber.

8. The method according to claim 7, wherein the dust collector is a fabric filter or an electrostatic precipitator.

9. The method according to claim 6, wherein the scrubber is a dry scrubber and further comprising die step of providing the mercury-free industrial gas to a dust collector in order to remove other non-mercuric particulates from the mercury-free industrial gas.

10. The method according to claim 9, wherein the dust collector is a fabric filter or an electrostatic precipitator.

\* \* \* \* \*